Dec. 13, 1938.  W. W. WISHART  2,140,304
SHAFT SEAL
Filed Jan. 9, 1937  2 Sheets-Sheet 1
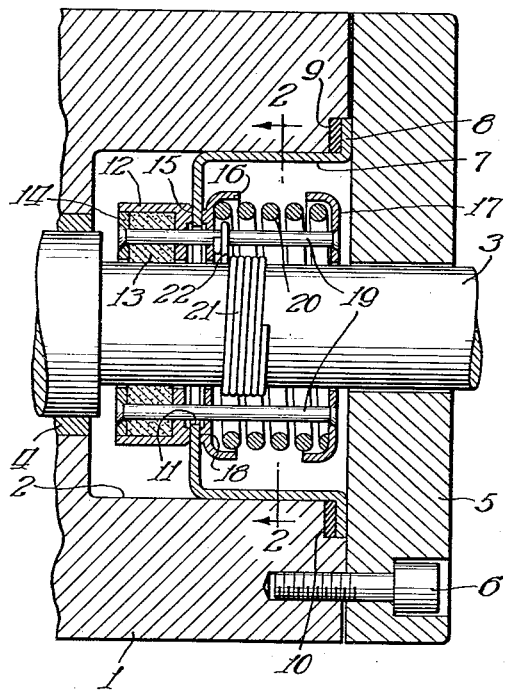
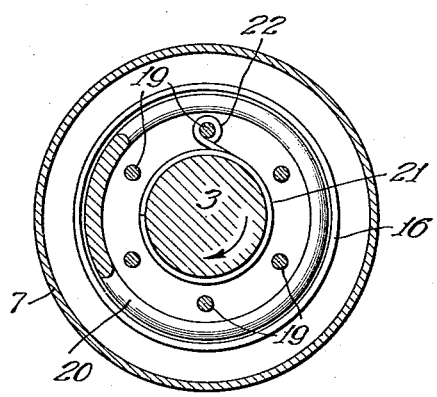
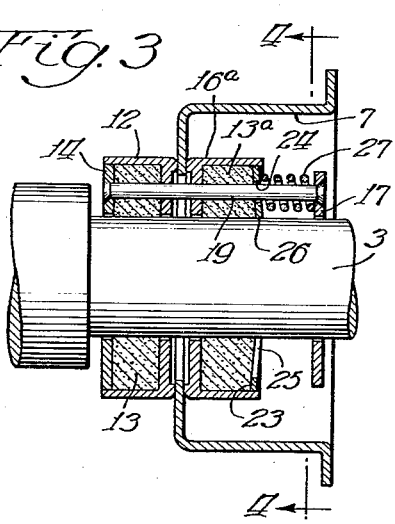
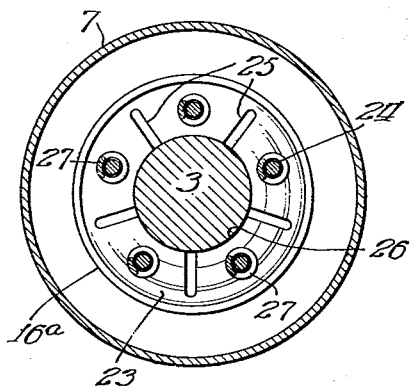
Inventor:
William W. Wishart
By: Langdon Moore
Atty.

Dec. 13, 1938. W. W. WISHART 2,140,304

SHAFT SEAL

Filed Jan. 9, 1937 2 Sheets-Sheet 2

Inventor:
William W. Wishart
By: Langdon Moore
Atty.

Patented Dec. 13, 1938

2,140,304

UNITED STATES PATENT OFFICE 2,140,304

SHAFT SEAL

William W. Wishart, Holland, Mich.

Application January 9, 1937, Serial No. 119,716

4 Claims. (Cl. 286—7)

This invention relates to improvements in seals and more particularly to seals about shafts driving compressors and pumps to prevent the fluid operated upon from escaping through the shaft bearings.

It is an object of this invention to provide a device of this character having a stationary part mounted about the shaft upon the pump or compressor casing exteriorly of the bearing through which the driving shaft passes coacting with a movable part mounted upon the shaft to rotate therewith to retain any of the fluid that may seep between the shaft and its bearing in the space between the exterior of the bearing and the seal.

It is a further object of this invention to provide an improved automatic positive connection between the shaft and the movable part of the seal which is easily applied to or removed from the shaft without impairing or defacing the surface of the shaft.

With these and other objects in view reference is made to the accompanying sheets of drawings which illustrate preferable forms of this invention as applied to the driving shaft of a compressor or pump with the understanding that minor changes may be made therein and the improved construction may be put to other uses without departing from the scope of the invention.

In the drawings:—

Figure 1 is a view in longitudinal vertical central section of one form of this improved seal, as applied to a compressor and with parts shown in elevation.

Figure 2 is a view in transverse section taken on the line 2—2, Figure 1, looking in the direction of the arrow.

Figure 3 is a view similar to Figure 1 of a modification omitting the casing and closure plate.

Figure 4 is a view in transverse section taken on the line 4—4, Figure 3, looking in the direction of the arrow.

Figure 5:
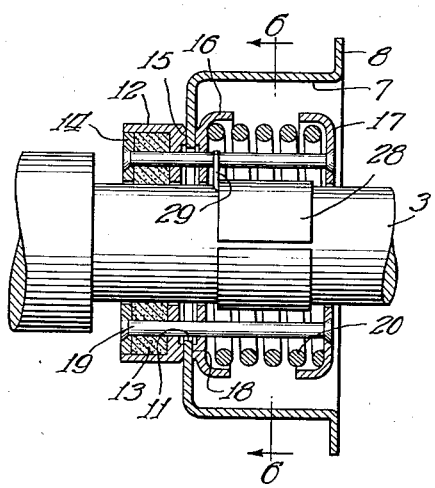
Figure 5 is a view similar to Figure 3 of another form of this invention.

As shown in Figure 1, to apply this improved seal, the casing 1 of the compressor is provided with a cylindrical chamber 2 about the shaft 3 and concentric therewith which extends inward to the shaft bearing 4. A cover plate 5 through which the shaft passes is secured in any desirable manner to the casing 1, as by a plurality of tap screws 6.

The immovable member of the seal is in the form of a perforated cup-shaped member 7 received within the chamber 2 which is provided with an annular outstanding flange 8 about its open end adapted to be received in an annular depression 9 provided in the casing 1 about the outer end of the chamber 2. It is preferable to place a gasket 10 between the flange 8 and recess 9 before securing the cover plate 5 so that the member 7 is held tightly in place. The perforation 11 in the bottom of the cup-shaped member 7 is circular in form and is concentric with the shaft 3 with its edge spaced apart from the circumference of the shaft. The opposite surfaces of the member 7 adjacent the perforation 11 are ground to form bearing surfaces for the movable member of the seal.

The movable member of the seal includes a bearing ring 12 on the side adjacent the shaft bearing 4 which is recessed to receive a suitable composition or packing 13 and an annular plate or washer 14 to retain the packing. The outer surface of the bearing ring 12 opposite this packing 13 is provided with an annular ground bearing surface 15 to engage the ground bearing surface of the member 7. On the other side of the perforation 11 of the member 7 are arranged a cup-shaped bearing ring 16 and an annular cup-shaped washer 17. The bearing ring 16 is provided with an annular ground bearing surface 18 to engage the ground bearing surface of the member 7. A plurality of tie-bolts 19 secured at their opposite ends to the plates or washers 14 and 17, respectively, are arranged about shaft 3 and pass through the perforation 11 of the immovable member 7. A compression coil spring 20 with its opposite ends engaging the ring 16 and plate or washer 17 is arranged about the tie-bolts 19 which not only forces the annular bearing surface 18 against the adjacent ground bearing surface about the perforation 11 of the immovable member, but also through plate or washer 17, tie-bolts 19, plate or washer 14, packing 13 forces the annular bearing surface 15 against the ground bearing about the opposite side of the perforation 11 of the immovable member 7.

The tension of the coil spring 20 can be such that it will exert sufficient pressure through tie-bolts 19 and plates or washers 17 and 14 to compress the packing 13 in the bearing ring 12 to cause it to engage the shaft 3 sufficiently to cause the said movable parts of the seal to rotate with the shaft. It is preferable to grind the annular bearing surfaces 15 and 18 and the bearing surfaces on the opposite sides of the immovable member 7 adjacent the perforation 11 to form lapped joints whereby a perfect seal is provided between the shaft bearing 4 and the atmosphere exterior of the casing 1.

It is preferable to provide the above-described seal with a positive locking engagement to the shaft 3. To accomplish this, this invention contemplates the provision of a coiled tension spring 21 of sufficient diameter to snugly receive the shaft 3 and anchor one end 22 to a tie-bolt 19, whereby upon rotation of the shaft the drag of the movable member of the seal upon the anchored end 22 of the spring 21 will cause the convolutions of the spring to contract and automatically lock the spring to the shaft and positively rotate the movable member in unison with the shaft.

In the modification shown in Figures 3 and 4 the cup-shaped bearing ring 16a is formed in the same manner as the bearing ring 12 and its recess is filled with packing 13a. Upon the exterior of the packing and within the recess therefor in ring 16a is mounted a convex annular washer 23 provided with a plurality of apertures 24 for the passage of the tie-bolts 19 and having a normal inner diameter to frictionally engage the shaft 3. The washer 16a is provided with a plurality of radial slits 25 extending from its inner circumference 26. In this form pressure is exerted upon the convex slotted washer 23 and transmitted through tie-bolts 19 from plate 17 to washer 14 by a plurality of coiled compression springs 27 arranged about each tie-bolt 19 between plate 17 and the convex washer 23 which in response to such pressure attempts to straighten into a plane and in so doing causes the edges of the inner portion between the slits 25 to grip the shaft 3 with an increasing frictional engagement in proportion to the strength of the springs 27, whereby the movable member is automatically locked to the shaft 3.

Figure 6:
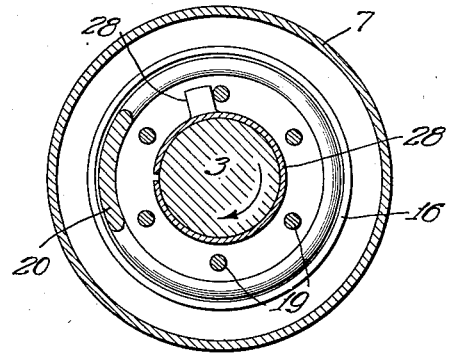
Figure 6 is a view in transverse section taken on the line 6—6, Figure 5, looking in the direction of the arrow.

In the form shown in Figures 5 and 6, the parts are the same as illustrated in Figures 1 and 2, with the exception that the tension spring 21 locking means is omitted and in its place a split friction band 28 is employed which is of sufficient diameter to frictionally engage the shaft 3. One edge of the split band 28 is provided with an upstanding projection or lug 29 to extend between two adjacent tie-bolts 19, so that as the shaft rotates the band 28 moves with it to engage a tie-bolt 19 and cause the movable member of the seal to travel in unison with the shaft 3.

Figure 7:
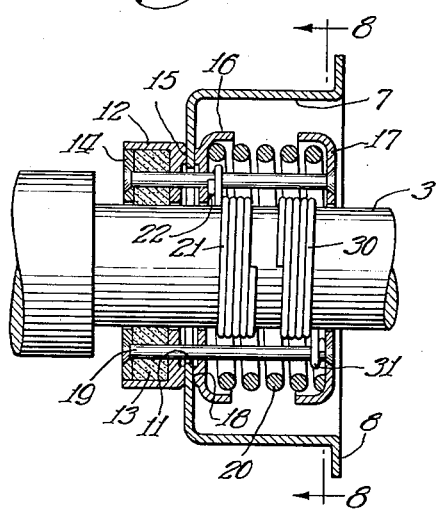
Figure 7 is a view similar to Figure 3 of a further modification of this invention.
Figure 8:
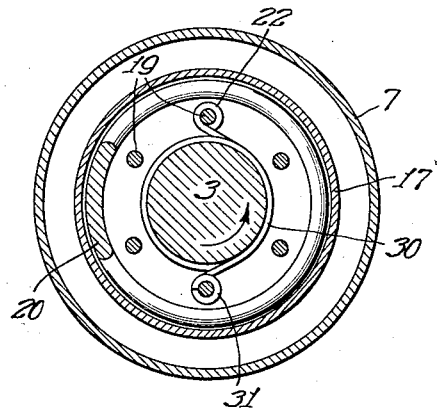
Figure 8 is a view in transverse section taken on the line 8—8, Figure 7, looking in the direction of the arrow.

Figures 7 and 8 illustrate the construction shown in Figures 1 and 2 to which has been added an additional coiled tension spring 30 with the end 31 of its exterior convolution anchored to a tie-bolt 19 so that the movable member of the seal will be automatically locked to the shaft 3 irrespective to its direction of rotation; that is, if the shaft rotates clockwise, spring 21 will lock upon the shaft 3, and if counter-clockwise, spring 30 will lock upon the shaft 3. If it is desirable to provide the seal with a universal lock irrespective of the direction of rotation of the shaft, a single spring equalling the convolutions or including more convolutions than both springs 21 and 30, shown in Figure 7, may be employed with its opposite ends anchored to different tie-bolts 19.

What I claim is:

1. A seal for driving shaft of a compressor or the like having a stationary member surrounding and spaced apart from the shaft and a movable member coacting on opposite sides with the stationary member mounted upon the shaft to travel therewith, a portion of the movable member in the form of a stuffing box about the shaft, packing in said stuffing box, means under tension acting upon portions of the movable member to cause the movable member to coact with the stationary member and to form a frictional engagement of the packing with the shaft to rotate the movable member therewith, and a coiled torsional spring mounted snugly about the shaft with one end secured to a portion of the movable member.

2. A seal for the driving shaft of a compressor or the like having a stationary member surrounding and spaced apart from the shaft and movable members coacting on opposite sides with the stationary member mounted upon the shaft to travel therewith, a portion of one of the movable members in the form of a stuffing box about the shaft, packing in said stuffing box, a single means under tension acting upon both of the movable members to cause the movable members to coact with the stationary member and to form a frictional engagement of the packing with the shaft to rotate the movable member therewith, and means attached to the movable members rendered effective upon rotation of the shaft in one direction to frictionally engage the movable members to the shaft.

3. A seal for the driving shaft of a compressor or the like having a stationary member surrounding and spaced apart from the shaft and movable members coacting on opposite sides with the stationary member mounted upon the shaft to travel therewith, a portion of one of the movable members in the form of a stuffing box about the shaft, packing in said stuffing box, a single means under tension acting upon both of the movable members to cause the movable members to coact with the stationary member and to form a frictional engagement of the packing with the shaft to rotate the movable members therewith, and resilient means having a member engageable by a movable member rendered effective upon rotation of the shaft to connect the shaft to the movable members.

4. A seal for the driving shaft of a compressor or the like having a stationary member surrounding and spaced apart from the shaft and movable members coacting on opposite sides with the stationary member mounted upon the shaft to travel therewith, a portion of one of the movable members in the form of a stuffing box about the shaft, packing in said stuffing box, a single means under tension acting upon both of the movable members to cause the movable members to coact with the stationary member and to form a frictional engagement of the packing with the shaft to rotate the movable members therewith, and resilient means having a member engageable by a moving member to grip the shaft upon rotation in one direction to connect the shaft to the movable members.

WILLIAM W. WISHART.